(12) United States Patent
Macfarlane

(10) Patent No.: US 8,146,572 B2
(45) Date of Patent: Apr. 3, 2012

(54) COOLED EXHAUST GAS RECIRCULATION SYSTEM WITH CYLINDER-LEVEL CONTROL

(75) Inventor: Glen Macfarlane, Howell, MI (US)

(73) Assignee: Chrysler Group LLC, Auburn Hills, MA (US)

( * ) Notice: Subject to any disclaimer, the term of this patent is extended or adjusted under 35 U.S.C. 154(b) by 193 days.

(21) Appl. No.: 12/643,323

(22) Filed: Dec. 21, 2009

(65) Prior Publication Data

US 2011/0146636 A1 Jun. 23, 2011

(51) Int. Cl.
*F02M 25/07* (2006.01)

(52) U.S. Cl. .................................. 123/568.12

(58) Field of Classification Search ............. 123/568.12, 123/568.13, 568.18, 586.12
See application file for complete search history.

(56) References Cited

U.S. PATENT DOCUMENTS

| | | | | |
|---|---|---|---|---|
| 1,384,133 A * | 7/1921 | Howe | | 123/316 |
| 3,702,111 A * | 11/1972 | Weaving et al. | | 123/568.2 |
| 4,192,265 A * | 3/1980 | Amano et al. | | 123/568.2 |
| 4,194,472 A * | 3/1980 | Amano et al. | | 123/274 |
| 4,276,865 A * | 7/1981 | Hamai | | 123/275 |
| 5,072,700 A * | 12/1991 | Kawamura | | 123/90.11 |
| 5,115,790 A * | 5/1992 | Kawamura | | 123/568.2 |
| 5,379,743 A * | 1/1995 | Stokes et al. | | 123/568.18 |
| 6,065,456 A * | 5/2000 | Miyoshi et al. | | 123/568.2 |
| 6,102,014 A * | 8/2000 | Donaldson | | 123/568.12 |
| 6,178,933 B1 * | 1/2001 | Lavy | | 123/568.11 |
| 6,941,905 B2 * | 9/2005 | Hitomi et al. | | 123/58.8 |
| 7,461,639 B2 * | 12/2008 | Jehlik | | 123/568.12 |
| 7,520,273 B2 * | 4/2009 | Freitag et al. | | 123/568.21 |
| 7,556,027 B2 * | 7/2009 | Duret | | 123/568.13 |
| 2002/0005190 A1 * | 1/2002 | Bianchi | | 123/568.12 |
| 2003/0140876 A1 * | 7/2003 | Yang et al. | | 123/90.15 |
| 2005/0016496 A1 * | 1/2005 | Hitomi et al. | | 123/305 |
| 2007/0175457 A1 * | 8/2007 | Lyons | | 123/568.12 |
| 2009/0173320 A1 * | 7/2009 | Maunoury | | 123/568.18 |

FOREIGN PATENT DOCUMENTS

| | | | |
|---|---|---|---|
| JP | 05086992 A | * | 4/1993 |
| JP | 05263719 A | * | 10/1993 |

* cited by examiner

*Primary Examiner* — Stephen K Cronin
*Assistant Examiner* — Arnold Castro
(74) *Attorney, Agent, or Firm* — Ralph E. Smith

(57) ABSTRACT

A cooled exhaust gas recirculation system includes one or more cylinders, each with several valves, an intake manifold, an exhaust manifold and a cooled exhaust gas recirculation chamber. The cooled exhaust gas recirculation chamber removes a portion of the exhaust that exits the cylinders, cools the removed portion of the exhaust, and recirculates the cooled removed portion of the exhaust for reintroduction into the cylinders. The cooled recirculated exhaust is reintroduced directly to the cylinders using a dedicated valve controlled by an electronic control unit.

13 Claims, 2 Drawing Sheets

COOLED EXHAUST GAS RECIRCULATION SYSTEM WITH CYLINDER-LEVEL CONTROL

FIELD OF THE INVENTION

The technology herein relates generally to gas spark ignition engines and more particularly to exhaust gas recirculation systems in such engines.

BACKGROUND OF THE INVENTION

Exhaust gas recirculation (EGR) is used in many internal combustion engines, and particularly gasoline and diesel engines. In an EGR system, a portion of an engine's exhaust gas is recirculated back to the engine cylinders. Therefore, at a time when a cylinder allows fuel, oxygen and other combustion products into the combustion chamber for ignition, vehicle exhaust is also allowed to enter the chamber. The introduction of vehicle exhaust into the combustion chamber has a number of consequences. One consequence is that the introduced exhaust displaces the amount of combustible matter in the chamber. Because the exhaust gases have already combusted, the recirculated gases do not burn again when introduced to the chamber. This results in a chemical slowing and cooling of the combustion process by several hundred degrees Fahrenheit. Thus, combustion of material in the cylinder results in a same pressure being exerted against the cylinder piston as results from combustion without the recycled exhaust, but at a lower temperature. The lower temperature leads to a reduced formation rate for nitrous oxide emissions. Thus, EGR technique results in less pollutants being emitted in an engine's exhaust.

Additionally, the introduction of recirculated exhaust into an engine cylinder allows for an increase in engine performance and fuel economy. As the combustion chamber temperature is reduced, the potential for harmful "engine knock" or engine detonation is also reduced. Engine detonation occurs when the fuel and air mixture in a cylinder ignite prematurely due to high pressure and heat. In engine detonation, instead of an associated spark plug controlling when a cylinder's fuel is ignited, the ignition occurs spontaneously, often causing damage to the cylinder. However, when the combustion chamber temperature is reduced due to EGR, the potential for engine detonation is also reduced. This allows vehicle manufacturers to program more aggressive (and hence, more efficient) timing routines into an associated spark timing program. Because of the aggressive timing routines, the vehicle's power control module (PCM) has a greater advance notice and thus more time to take measures to prevent engine detonation. The aggressive timing routines can also result in higher cylinder pressures leading to increased torque and power output for the vehicle. For these and additional reasons, high levels of EGR are especially useful when applied to turbocharged or supercharged engines.

Thus, EGR systems provide tremendous benefits to motor vehicle engines. However, EGR systems do have limitations. For example, although using an EGR system to recirculate increasingly large amounts of exhaust will result in combustion chambers dropping even further in temperature, high levels of EGR also result in a combustion delay. To a limited extent, this delay can be compensated for by using an appropriate spark timing program. However, if EGR levels are too high, even spark timing programs are not able to correct the situation, and noticeable delays in the generation of power for the vehicle will occur. Additionally, there is generally a delay or transient response time to desired changes in EGR levels, and this transient response time is amplified at high levels of EGR. Accordingly, there is a desire to obtain the benefits of increased EGR without incurring the delay penalties normally associated with high levels of EGR.

BRIEF SUMMARY OF THE INVENTION

In various example embodiments, the technology described herein provides a cooled exhaust gas recirculation system. The system includes one or more cylinders, each with several valves, an intake manifold, an exhaust manifold and a cooled exhaust gas recirculation chamber. The cooled exhaust gas recirculation chamber removes a portion of the exhaust that exits the cylinders, cools the removed portion of the exhaust, and recirculates the cooled removed portion of the exhaust for reintroduction into the cylinders. The cooled recirculated exhaust is reintroduced directly to the cylinders using a dedicated valve controlled by a control unit such as an electronic control unit.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an exemplary embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

In various example embodiments, the technology described herein provides a cooled exhaust gas recirculation system. Additionally, in various example embodiments, this technology provides an exhaust gas recirculation system with cylinder-level control. Other comparable uses are also contemplated herein, as will be obvious to those of ordinary skill in the art.

The positive effects of high levels of EGR can be recreated by using lower levels of cooled EGR. By cooling a vehicle's exhaust before the exhaust is recirculated into the engine cylinders, temperatures in the cylinder combustion chamber are further reduced. Furthermore, the effectiveness of EGR may be optimized through more localized control of the amount of EGR being recirculated into each cylinder of an engine, as explained below.

Figure 1:
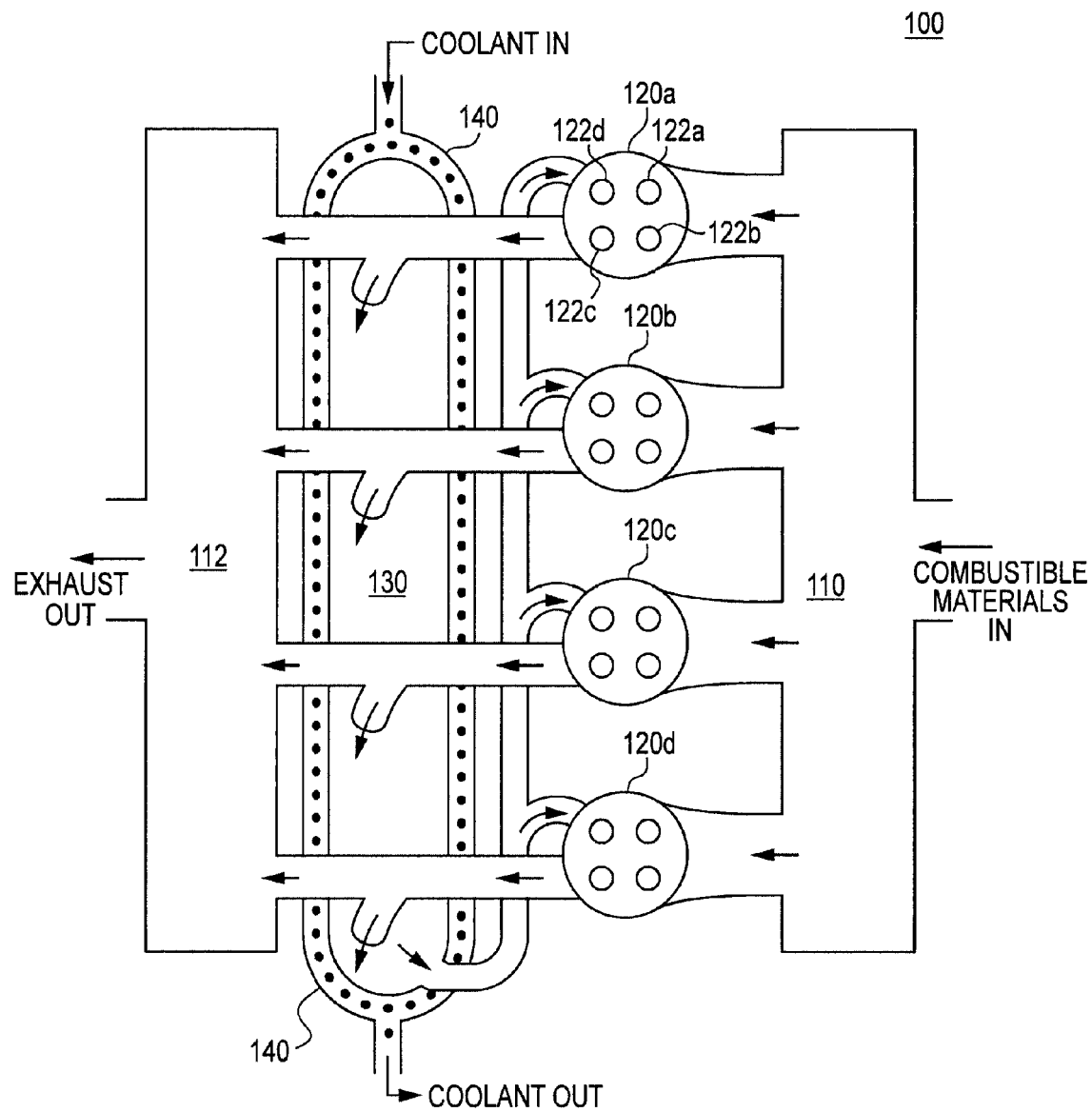
FIG. 1 illustrates a cooled exhaust gas recirculation system according to a disclosed embodiment.

In one example embodiment, FIG. 1 illustrates a cooled EGR system 100. The system 100 includes an intake manifold 110, an exhaust manifold 112, and cylinders 120a-120d (collectively referred to herein as "cylinders 120"). The intake manifold 110 provides an injection material such as gasoline, air, or a gasoline/air mix to the cylinders 120. The exhaust manifold 112 collects the exhaust gases from the cylinders 120. The cylinders 120a-120d are each essentially identical and represent, in FIG. 1, a four-cylinder engine. The number of cylinders 120 represented in FIG. 1 is not limiting; any number of cylinders may be used in the system 100.

The cylinders 120 each include a combustion chamber and a plurality of valves 122a-122d (collectively referred to herein as "valves 122"). The number of valves 122 is also not meant to be limiting. In the example of FIG. 1, valves 122a, 122b are fuel intake valves. Valve 122c is an exhaust output valve. Valve 122d is a recirculated cooled exhaust intake valve. Additional intake and exhaust valves may be used. The valves 122 may be poppet valves or other valves known in the art.

The system 100 also includes a recirculated exhaust chamber 130. The chamber 130 is cooled using coolant tubes 140. The recirculated exhaust chamber 130 is coupled to receive a portion of the exhaust that exits the cylinders 120 via exhaust valve 122c. The recirculated exhaust chamber 130 collects exhaust and returns it directly to cylinders 120 via valve 122d. The exhaust returned to the cylinders 120 via valve 122d is cooled by a coolant that passes through the coolant tubes 140. The coolant can be water or another coolant as is known in the art. The coolant flows through the coolant tubes 140, absorbing heat from the exhaust in the recirculated exhaust chamber 130. The coolant is pumped through the coolant tubes 140 using an engine-driven water pump, electric water pump, or other pumping system known in the art.

By cooling the exhaust in the recirculated exhaust chamber 130, exhaust returned to the cylinders 120 acts to further reduce the temperature in the cylinder combustion chamber. The additional temperature reduction results in a corresponding reduction in nitrous oxide emissions, as well as an ability to further refine the efficiency of the engine through aggressive timing routines.

Additionally, because each cylinder has a dedicated valve for the intake of recirculated cooled exhaust (valve 122d), each cylinder can tightly control the amount of recirculated cooled exhaust that should be input, even cycle-by-cycle control. In conventional systems, the recirculated exhaust is returned to the cylinders via the intake manifold 110. However, this conventional technique presents two issues. First, by adding the recirculated exhaust to the intake manifold 110 and not directly to the cylinders 120, any EGR control at the cylinder-level is lost. EGR ratios are optimized for the engine as a whole, and not for individual cylinders. Second, by adding recirculated exhaust at some point upstream of the cylinders 120, a lag is introduced between the addition of controlled ratios of EGR and the effect of the EGR in the cylinders 120. However, both of these problems are solved by adding the recirculated exhaust directly to each cylinder 120 using dedicated valves 122d.

The valves 122a-122d are electronically controlled, as is known in the art. Control is accomplished using an electronic control unit (ECU). Control is influenced by feedback sensors that determine the effectiveness of the exhaust/air/fuel combination in the cylinders 120. Feedforward control may alternatively be used to ensure effective operation.

Figure 2:
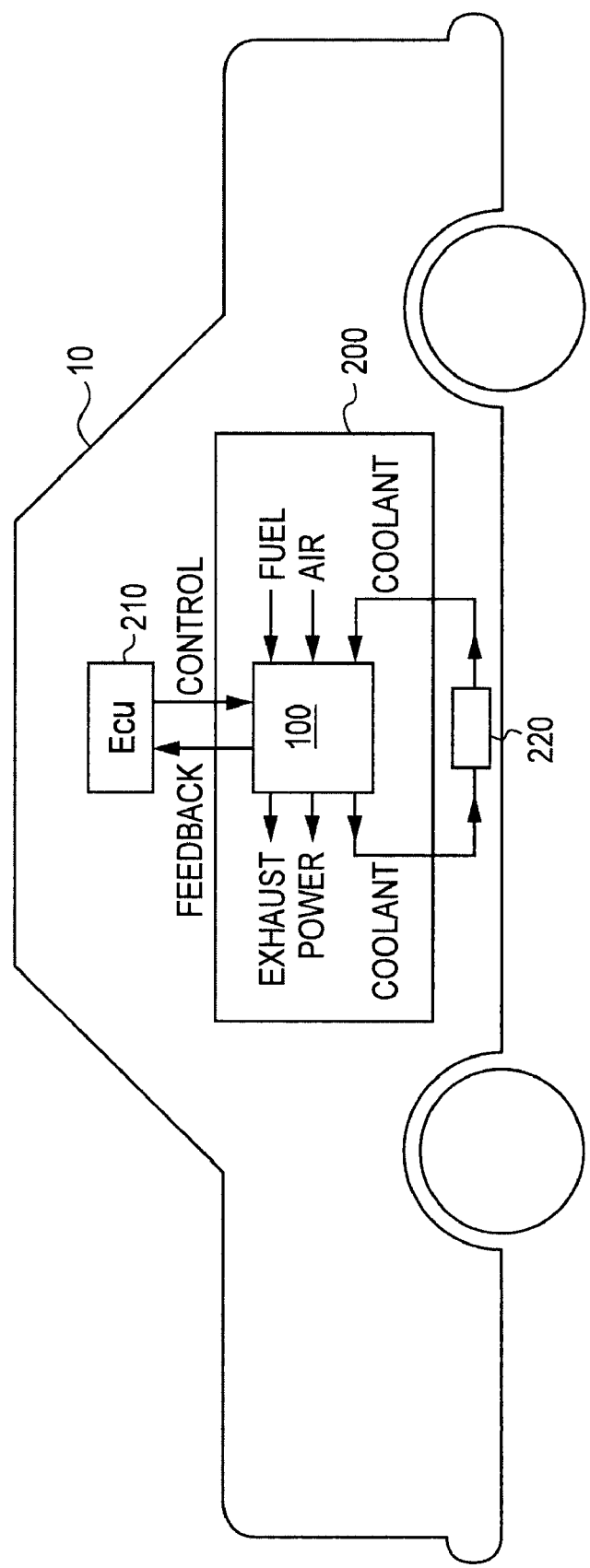
FIG. 2 is illustrates a vehicle incorporating a cooled exhaust gas recirculation system according to a disclosed embodiment.

FIG. 2 illustrates a vehicle 10 that includes the cooled EGR system 100 of FIG. 1. In FIG. 2, the cooled EGR system 100 is only a portion of the vehicle's drivetrain 200. The system 100 intakes air and fuel and produces exhaust as it converts chemical potential to mechanical power. The system 100 also intakes cooled coolant and produces warmed coolant that is then re-cooled using air-cooled radiator 220 or other techniques known in the art. The timing and composition of the materials added to the cylinders of system 100 are controlled by the vehicle's ECU 210. Specifically, ECU 210 controls the timing of the opening of valves that allow materials to enter and exit the cylinders. Feedback from the system 100 allows the ECU 210 to adjust the timing control signals sent to the system 100.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. An exhaust gas recirculation system, comprising:
    a plurality of cylinders, each cylinder having a plurality of intake/exhaust valves;
    an intake manifold for inputting a combustible material to each of the plurality of cylinders via at least one of each cylinder's intake/exhaust valves;
    an exhaust manifold for removing exhaust from each of the plurality of cylinders via at least one of each cylinder's intake/exhaust valves; and
    a cooled exhaust gas recirculation chamber for removing a portion of the exhaust exiting the plurality of cylinders to the exhaust manifold, cooling the removed portion of the exhaust, and recirculating the cooled removed portion of the exhaust for reintroduction into the plurality of cylinders without reintroduction into the intake manifold.

2. The system of claim 1, wherein the cooled removed portion of the exhaust is recirculated by reintroducing the cooled removed portion of the exhaust directly to each of the plurality of cylinders.

3. The system of claim 2, wherein the plurality of intake/exhaust valves for each of the plurality of cylinders includes a dedicated intake valve for the reintroduction of the cooled removed portion of the exhaust.

4. The system of claim 3, further comprising an electronic control unit to control the opening and shutting of the dedicated intake valve at each of the plurality of cylinders.

5. The system of claim 1, wherein the cooled exhaust gas recirculation chamber includes a plurality of coolant tubes proximate to the cooled exhaust gas recirculation chamber for cooling the removed portion of the exhaust.

6. The system of claim 5, wherein the coolant tubes are filled with water.

7. A method of providing an exhaust gas recirculation system in a vehicle, the method comprising:
    providing a plurality of cylinders, each cylinder having a plurality of intake/exhaust valves;
    providing an intake manifold for inputting an injection material to each of the plurality of cylinders via at least one of each cylinder's intake/exhaust valves;
    providing an exhaust manifold for removing exhaust from each of the plurality of cylinders via at least one of each cylinder's intake/exhaust valves; and
    providing a cooled exhaust gas recirculation chamber for removing a portion of the exhaust exiting the plurality of cylinders to the exhaust manifold, cooling the removed portion of the exhaust, and recirculating the cooled removed portion of the exhaust for reintroduction into the plurality of cylinders without reintroduction into the intake manifold.

8. The method of claim 7, wherein the cooled removed portion of the exhaust is recirculated by reintroducing the cooled removed portion of the exhaust directly to each of the plurality of cylinders.

9. The method of claim 8, wherein the reintroduction of the cooled removed portion of the exhaust into the plurality of cylinders is through a dedicated intake valve.

10. The method of claim 9, further comprising providing an electronic control unit to control the opening and closing of the dedicated intake valve at each of the plurality of cylinders.

11. The method of claim 7, further comprising providing a plurality of coolant tubes proximate to the cooled exhaust gas recirculation chamber for cooling the removed portion of the exhaust.

12. The method of claim 11, wherein the coolant tubes are filled with water.

13. The method of claim 7, wherein the injection material is one of air, gasoline, or an air/gasoline mix.

* * * * *